US010829893B2

(12) United States Patent
Dubovoi et al.

(10) Patent No.: US 10,829,893 B2
(45) Date of Patent: Nov. 10, 2020

(54) PAPER-LIKE AND NANOCOMPOSITE MATERIAL BASED ON MINERAL FIBER

(71) Applicant: HOWICKEN MANAGEMENT LIMITED, Nicosia (CY)

(72) Inventors: Evgenii Vladimirovich Dubovoi, St. Peterrsburg (RU); Vladimir Klimentievich Dubovyi, St. Petersburg (RU)

(73) Assignee: Howicken Management Limited, Nicosia (CY)

( * ) Notice: Subject to any disclaimer, the term of this patent is extended or adjusted under 35 U.S.C. 154(b) by 119 days.

(21) Appl. No.: 15/777,660

(22) PCT Filed: Dec. 29, 2015

(86) PCT No.: PCT/RU2015/000947
§ 371 (c)(1),
(2) Date: May 19, 2018

(87) PCT Pub. No.: WO2017/086833
PCT Pub. Date: May 26, 2017

(65) Prior Publication Data

US 2018/0371695 A1 Dec. 27, 2018

(30) Foreign Application Priority Data

Nov. 19, 2015 (RU) ................................ 2015149772

(51) Int. Cl.

| | |
|---|---|
| ***D21H 13/40*** | (2006.01) |
| ***D21H 13/36*** | (2006.01) |
| ***B82Y 30/00*** | (2011.01) |
| ***D21H 17/66*** | (2006.01) |
| ***D21H 17/67*** | (2006.01) |
| ***D21H 17/00*** | (2006.01) |
| ***D21H 21/06*** | (2006.01) |

(52) U.S. Cl.
CPC .............. *D21H 13/40* (2013.01); *B82Y 30/00* (2013.01); *D21H 13/36* (2013.01); *D21H 17/66* (2013.01); *D21H 17/675* (2013.01); *D21H 17/73* (2013.01); *D21H 21/06* (2013.01)

(58) Field of Classification Search
CPC ........ D21H 13/36; D21H 13/40; D21H 17/66; D21H 17/675; D21H 17/73; D21H 21/06; D21F 11/00; D21F 11/10; D21F 11/14; F25B 39/00; F25B 39/04; C08K 7/14; B82Y 30/00; Y10T 428/2924
See application file for complete search history.

(56) References Cited

U.S. PATENT DOCUMENTS

| | | | | | |
|---|---|---|---|---|---|
| 5,290,522 | A * | 3/1994 | Rogers | B01D 53/9454 | 422/179 |
| 6,593,408 | B1 * | 7/2003 | Takaki | A61K 8/11 | 524/414 |
| 8,124,022 | B2 * | 2/2012 | Howorth | A61M 39/24 | 422/179 |
| 2012/0132864 | A1 * | 5/2012 | Kar | C08K 7/06 | 252/511 |
| 2015/0052880 | A1 * | 2/2015 | Vandervoort | F02B 77/11 | 60/311 |
| 2018/0371695 | A1 * | 12/2018 | Dubovoi | B01D 39/2086 | |

FOREIGN PATENT DOCUMENTS

| | | | | |
|---|---|---|---|---|
| CA | 2878201 | A1 * | 1/2014 | C08K 3/346 |
| EP | 3404141 | A1 * | 11/2018 | D21H 13/40 |
| JP | 04185799 | A | 7/1992 | |
| JP | 2018104879 | A * | 7/2018 | |
| RU | 2425919 | C1 | 4/2010 | |
| RU | 2478747 | C2 | 5/2011 | |
| RU | 2003750 | C1 | 8/2011 | |
| WO | WO-2012033565 | A2 * | 3/2012 | B82Y 30/00 |
| WO | WO-2012038786 | A1 * | 3/2012 | C08K 7/06 |
| WO | WO-2015023642 | A1 * | 2/2015 | C08K 9/06 |
| WO | WO-2017086833 | A1 * | 5/2017 | D21H 13/40 |

OTHER PUBLICATIONS

International Search Report, PCT/RU/2015000947 dated Aug. 25, 2016.

* cited by examiner

*Primary Examiner* — Jose A Fortuna
(74) *Attorney, Agent, or Firm* — Meunier Carlin & Curfman LLC

(57) ABSTRACT

A paper-like nanocomposite material based on mineral fibers, which can be used as a capillary-porous element of evaporative-type air-cooling units. The material is made using glass fibers with a diameter of 0.4 μm as mineral fibers and sodium aluminate and aluminum sulfate as a binder. The material is made on traditional papermaking equipment using casting technique with a specified ratio of the above components.

1 Claim, No Drawings

PAPER-LIKE AND NANOCOMPOSITE MATERIAL BASED ON MINERAL FIBER

CROSS REFERENCE TO RELATED APPLICATIONS

This application is a 371 national phase of International Application No. PCT/RU2015/000947, filed Dec. 29, 2015, which is incorporated by reference as if written herein in its entirety.

BACKGROUND OF THE INVENTION

Field of the Invention

The invention is related to the field of paper-like composite materials and can be used as capillary-porous elements of evaporative-type air-cooling units.

Description of the Related Art

There is a capillary-porous material that is well-known that contains glass fibers with a diameter of 0.2 μm and an inorganic binder (patent RU 2478747 C2, May 15, 2011). This invention uses mineral fibers of various diameters and nature, that provide a capillary-porous structure, while the strength is regulated by the amount of binder.

The closest analogue is a paper-like material made of glass fibers of 0.25 μm in diameter, using aluminum salts and polyvinyl acetate emulsion (PVAE) as binder, with the addition of polyvinyl alcohol fibers (PVA), (patent RU 2425919 C1, Apr. 15, 2010).

The aim of the invention is to provide a paper-like nanocomposite with a hydrophilic capillary-porous structure in order to provide high absorbency, moisture capacity, size invariance (no swelling or warpage) and resistance to mold, fungi, and microorganisms of the aquatic environment, non-toxic and with a technological strength enough to be processed into various wares.

BRIEF SUMMARY OF THE INVENTION

The above aim was achieved by providing a paper-like nanocomposite material based on mineral fibers made on paper making equipment using casting technique and using glass fibers with a diameter 0.4 μm as mineral fibers and $NaAlO_2$ and $Al_2(SO_4)_3$ as a binder with the following ratio of components (mass. %):glass fibers with a diameter 0.4

μm—70%, sodium aluminate $NaAlO_2$ —5-25% (by $Al_2O_3$), aluminum sulfate $Al_2(SO_4)_3$—5-25% (by $Al_2O_3$).

DETAILED DESCRIPTION OF THE INVENTION

A series of research work was carried out with the subsequent production of an experimental batch of material. The casting of the material was carried out according to a conventional paper-based molding technique on a LOA-2 sheet paper machine. The experimental lot was made on "Voit" paper machine, and introduced into the production of energy-saving, environmentally friendly evaporative-type air-cooling units.

Glass fibers with a nominal diameter of 0.4 μm were used as mineral fibers. These fibers are hydrophilic and at the same time they do not swell and have a large specific surface, which is important when forming a thin capillary-porous structure in the process of forming a sheet. In contrast to fibers of plant origin, mineral fibers do not have the bonding ability. To provide bonding, a measured amount of sodium aluminate solution ($NaAlO_2$) with a pH of 12 was added to the composition. The formation of polynuclear complexes was provided by measured addition of aluminum sulfate ($Al_2(SO_4)_3$) solution with medium pH of 3.

As a result of the hydrolytic reaction, polynuclear complexes are formed that can react with functional groups located on the surface of the fiber with the formation of a coordinate bond—in particular, a hydrogen bond. The resulting polynuclear complexes provide strength, and also synergize the fine capillary-porous structure of the material formed by Ø 0.4 μm glass fibers. Active regulation of the pH of the medium, achieved by changing the ratio between the amounts of $NaAlO_2$ and $Al_2(SO_4)_3$, makes it possible to obtain polynuclear complexes with different reactivity and dimensionality. The reactivity provides the strength characteristics and the dimensionality guarantees a thin capillary-porous structure. This method of introducing and forming a binder when molding the material makes up the claim for novelty of the invention.

As a result of the experimental production, the material was obtained using the following ratio of components by mass (%): Ø 0.4 μm glass fiber—70%, $NaAlO_2$—5-25%, $Al_2(SO_4)_3$—5-25%. The material has properties presented in Table 1 and differs from those known in blend composition and higher characteristics in height and time of water rise, moisture capacity and strength.

Table 1 gives examples of material compositions and their properties

TABLE 1

| No. | Properties | Compositions: Ø 0.4 μm glass fiber - 70% $NaAlO_2$ - 5% $Al_2(SO_4)_3$ - 25% | Ø 0.4 μm glass fiber - 70% $NaAlO_2$ - 15% $Al_2(SO_4)_3$ - 15% | Ø 0.4 μm glass fiber - 70% $NaAlO_2$ - 25% $Al_2(SO_4)_3$ - 5% |
|---|---|---|---|---|
| 1 | Mass 1 sq. m, g | 100 | 100 | 100 |
| 2 | Thickness, mm | 0.5 | 0.5 | 0.5 |
| 3 | Maximum water rise height with vertical position of the plate at 20° C., mm | 400 | 500 | 400 |
| 4 | Water rise time with vertical position of the plate and a height of up to 180 mm at 20° C., min | 10 | 6 | 8 |

TABLE 1-continued

| No. | Properties | Compositions: Ø 0.4 μm glass fiber - 70% $NaAlO_2$ - 5% $Al_2(SO_4)_3$ - 25% | Ø 0.4 μm glass fiber - 70% $NaAlO_2$ - 15% $Al_2(SO_4)_3$ - 15% | Ø 0.4 μm glass fiber - 70% $NaAlO_2$ - 25% $Al_2(SO_4)_3$ - 5% |
|---|---|---|---|---|
| 5 | Moisture capacity, % | 600 | 700 | 600 |
| 6 | Breakdown force in machine direction, H | 8 | 10 | 8 |

Due to its inorganic nature, the material is characterized by its thermic, chemical and biological stability, absence of toxicity and zero emission of harmful substances into the air, resistance to mold, fungi and microorganisms in the aquatic environment.

Based on the data contained in the table, the presented materials have better characteristics compared to their analogs and can be used as capillary-porous elements in evaporative-type air cooling units.

The presence of a nanoscale binder in the composition, which is confirmed by electron microscopy, as well as the significant effect of same on the properties of the material, gives the right to assert that the production of these materials belongs to the realm of nanotechnology.

What is claimed is:

1. Paper-like nanocomposite material made on paper making equipment using casting technique and using glass fibers with a diameter 0.4 μm as mineral fibers and $NaAlO_2$ and $Al_2(SO_4)_3$ as a binder with the following ratio of components, mass %:

glass fibers with a diameter 0.4 μm 70%;

sodium aluminate ($NaAlO_2$)—5-25% (by $Al_2O_3$); and aluminum sulfate ($Al_2(SO_4)_3$)—5-25% (by $Al_2O_3$).

* * * * *